United States Patent [19]

Fujiwara et al.

[11] 4,017,320

[45] Apr. 12, 1977

[54] CERAMIC DIELECTRIC COMPOSITION

[75] Inventors: Shinobu Fujiwara; Hitoshi Tanaka, both of Akita, Japan

[73] Assignee: TDK Electronics Company, Limited, Tokyo, Japan

[22] Filed: Nov. 19, 1975

[21] Appl. No.: 633,237

Related U.S. Application Data

[63] Continuation of Ser. No. 449,640, March 11, 1974, abandoned.

[52] U.S. Cl. .............................. 106/73.3; 106/73.2; 252/63.5
[51] Int. Cl.² .................. C04B 35/00; C04B 35/46
[58] Field of Search ........................ 106/73.3, 73.2; 252/63.5

[56] References Cited

UNITED STATES PATENTS

| | | | |
|---|---|---|---|
| 3,352,697 | 11/1967 | Fujiwara | 106/733 |
| 3,400,001 | 9/1968 | Hasumi et al. | 106/73.3 |
| 3,468,680 | 9/1969 | Fujiwara | 106/73.3 |

*Primary Examiner*—Winston A. Douglas
*Assistant Examiner*—John F. Niebling
*Attorney, Agent, or Firm*—Thomas M. Meshbesher

[57] ABSTRACT

A ceramic dielectric composition is provided including 30 to 94% by mol of $SrTiO_3$, 1 to 22% by mol of $Bi_2O_3$ and 5 to 69% by mol of $TiO_2$, and further including 0.1 to 20% by weight of MgO with respect to the total weight of the above-mentioned three compounds $SrTiO_3$, $Bi_2O_3$ and $TiO_2$, whereby the ceramic dielectric composition has a high dielectric constant and a low dielectric loss and further the variations of the dielectric constant and the dielectric loss with respect to the variation of an applied voltage, are respectively, very small.

6 Claims, 4 Drawing Figures

CERAMIC DIELECTRIC COMPOSITION

CROSS-REFERENCE TO RELATED APPLICATION

This application is a continuation of our co-pending application Ser. No. 449,640, filed Mar. 11, 1974 abandoned.

The present invention relates generally to a ceramic dielectric composition, and more particularly relates to a composition for a ceramic dielectric which has a high dielectric constant, a low dielectric loss, a superior dielectric and also very small variations of the dielectric loss and the electrostatic capacity with respect to a wide variation of an applied voltage.

A ceramic dielectric with a high dielectric constant, a superior dielectric constant changing ratio with respect to applied temperature, a low dielectric loss and also with almost no variations of the electrostatic capacity and of the dielectric loss with respect to a wide variation of an applied voltage, would be very useful when utilized in place of the known ceramic dielectrics in certain high AC voltage apparatuses or circuits. Examples of such apparatuses or circuits are: vacuum or gas circuit brakers and arresters or ceramic bushings in which ceramic dielectrics are used for the purpose of improving the uniformity of the distribution of high AC voltage; transmission systems in which ceramic dielectrics are used to absorb the surge voltage, and; impulse voltage measuring apparatuses in which ceramic dielectrics act as voltage dividers. Ceramic dielectrics, having the characteristics mentioned above would also be very useful in such high DC voltage apparatuses for circuits as, for example, the voltage multiplying rectifiers of television receivers or oscilloscopes.

In the prior art, the ceramic dielectrics for high AC and DC voltage, utilized in the above-mentioned apparatuses or circuits, consist mainly of barium titanate and a small quantity of other materials such as titanates. However, the ceramic dielectrics of the prior art perform poorly in the above-mentioned high AC and DC voltage apparatuses or circuits because said prior art ceramic dielectrics have a large dielectric loss and a low dielectric constant. Further, variations of the dielectric constant, the dielectric loss and the electrostatic capacity with respect to wide variation, of an applied voltage are all too large and in addition, variation of the electrostatic capacity with respect to change of applied temperature is also too large.

One prior art example of the ceramic dielectric being utilized for the above-mentioned high voltage apparatuses or circuits is provided by the U.S. Pat. No. 3,352,697 which corresponds to the Japanese Patent Publication No. Sho 40-5981. Ceramic dielectrics provided in this U.S. patent have high dielectric constants and superior Q-values, however, the changing ratio of the electrostatic capacity with respect to a wide variation of applied temperature and the dielectric loss are too large for practical use.

Therefore, it is the principal object of the present invention to provide a composition for a ceramic dielectric which has a high dielectric constant, an extremely low dielectric loss, a small variation of the electrostatic capacity with respect to applied temperature and also small variations of the dielectric loss and the electrostatic capacity with respect to applied voltage.

Another object of the present invention is to provide materials which are added in small quantities to a basic composition of the ceramic dielectric according to the present invention and result in a sintered ceramic dielectric which is dense and uniform.

In order to accomplish asaid principal object, the present invention provides a ceramic dielectric composition which comprises 30 to 94% by mol of strontium titanate ($SrTiO_3$), 1 to 22% by mol of dibismuth trioxide ($Bi_2O_3$) and 5 to 69% by mol of titanium dioxide ($TiO_2$), and further, comprises 0.1 to 20% by weight of magnesium oxide (MgO) with respect to the total weight of the above-mentioned three components ($SrTiO_2$, $Bi_2O_3$, $TiO_2$). The ceramic dielectric composition according to the present invention preferably includes under 10% by weight of at least one of the rare earth elements.

In order to accomplish said other object, the above-mentioned dielectric composition further includes at least one of the following materials as a mineralizer: the metallic oxides formed by Mn, Cr, Fe or Co, or clay. The above-mentioned materials $Bi_2O_3$, $TiO_2$ and MgO respectively become well combined with $SrTiO_2$, by adding one of said mineralizers. Consequently the composition of the ceramic dielectric according to the present invention can be sufficiently sintered with the result that the sintered ceramic dielectric is dense and uniform.

Additions of said metallic oxide MgO and said rare earth element to the ceramic dielectric composition result in the advantages of improving the electrostatic capacity changing ratio with respect to applied temperature and minimizing the dielectric loss of the ceramic dielectric, as well as the additional advantage of making the sintered ceramic dielectric dense and uniform, as mentioned before.

The present invention will be more apparent from the following description and the accompanying drawings wherein.

Figure 1:
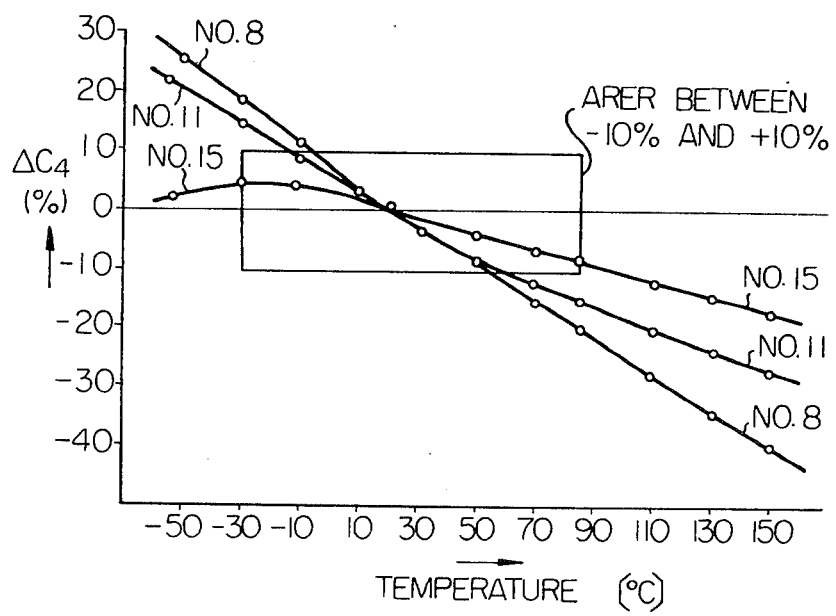
FIG. 1 shows the variations of the electrostatic capacity changing ratio $\Delta C_4$ (by %) with respect to a wide variation of applied temperatures with regard to ceramic dielectrics which are within the limits of the present invention and ceramic dielectrics which are beyond said limits.

The present invention will next be described by means of examples with reference to Table I at the end of the description.

EXAMPLE

A predetermined % by mol of strontium carbonate ($SrCO_3$) and the same % by mol of titanium dioxide ($TiO_2$) are mixed, and pre-sintered at 1150° C for two hours. Then the pre-sintered mixture is ground into powder, whereby SrTiO₃ is obtained. SrTiO₃, TiO₂, Bi₂O₃, MgO which is added in the form of MgCO₃, and at least one of the rare earth elements are then mixed in the mol or weight proportions (%) as indicated in columns 1 and 2 of Table I, wherein 0.1% by weight of MnO₂ as mineralizer is further added to said mixture. The obtained mixture, after adding some binders, is pressed and shaped into disks of 16.5 $\phi$ × 1.0 mm'. Then, the shaped bodies are sintered at 1100° to 1300° C for two hours and, thus, sintered ceramic bodies, are obtained. Then, the two faces of the resultant ceramic body are painted with silver electrode paste. After being painted with the silver electrode paste said ceramic body is heated in air up to about 800° C and, thus, the painted silver electrode material is plated on the faces of said ceramic body. Then, if necessary, lead terminals are attached to the plated silver electrode and the insulating paste is painted onto portions of the surface of the ceramic body, and the variations electric characteristics of the respective specimens are measured, as can be seen in columns 3 through 7 of Table I.

Based on experiments conducted for the present invention, it has been found that sintered ceramic bodies can also be obtained by adding a very small amount of clay such as silica or alumina to said obtained mixture, or by exchanging said manganese dioxide (MnO₂) with other metallic oxide formed by other metals such as Fe or Co.

It should be noted that the procedure for obtaining a sintered ceramic body is not limited to the procedure which has been hereinbefore mentioned and that the sintered ceramic body can also be obtained through a procedure which will be mentioned next. Predetermined quantities of SrCO₃, TiO₂, Bi₂O₃, MgCO₃ and at least one of the oxides of rare earth elements are mixed, and pre-sintered. Then the pre-sintered mixture is ground into powder. The powder of the pre-sintered mixture after adding some binders, is pressed and shaped into disks and then, the shaped bodies are sintered. Thus, sintered ceramic bodies are obtained. The electric characteristics of the sintered ceramic body which is obtained through this process are, of course, the same as that of the sintered ceramic body which is obtained through the process mentioned before.

Column I of Table I shows different proportions of the basic materials SrTiO₂ (% by mol), Bi₂O₃ (% by mol), TiO₂ (% by mol) and MgO (% by weight), of thirty three specimens No. 1 through 34, except for 33, which were produced by the same procedure as mentioned before. In Table I specimen No. 33 which has an asterisk is an example of the prior art and the specimens No. 1, 3, 7, 8, 11, 24, 27, 30, 32, 34, the number of which are circled, are beyond the limits of the present invention. Column 2 of Table I indicates what kinds of and quantities (% by weight) of rare earth elements in the form of oxides are included, or not included, in the respective specimens. Columns 3, 4, 5, 6, and 7 of Table I show the various electric characteristics of the respective specimens. The dielectric constant $\epsilon_s$, at AC 5 V r.m.s. (at 1 KHz), the dielectric loss factor tan $\delta$, by % (at 1 KHz and 1 MHz), the electrostatic capacity changing ratio $\Delta C_1$ by %, and the dielectric loss factor tan $\delta$, by %, both of the last two mentioned under an AC voltage gradient of 0.5 KV/mm (at 50 Hz), the electrostatic capacity changing ratio $\Delta C_2$, by % at a DC voltage gradient of 2 KV/mm, and the electrostatic capacity changing ratio $\Delta C_3$, by % at $-30°$ C and $+85°$ C of the respective specimens, are shown in the columns 3, 4, 5, 6 and 7, respectively. Said electrostatic capacity changing ratios $\Delta C_1$, $\Delta C_2$ and $\Delta C_3$ in Table I are defined as follows, wherein [C] indicates values of the electrostatic capacity at 20° C.

$$\Delta C_1 = \frac{[C] \text{ at AC 5 V r.m.s.} - [C] \text{ at AC 0.5 KV r.m.s./mm}}{[C] \text{ at AC 5 V r.m.s./mm (at 1 KHz)}} \times 100$$

$$\Delta C_2 = \frac{[C] \text{ at AC 5 V r.m.s.} - [C] \text{ at DC 2 KV/mm}}{[C] \text{ at AC 5 V r.m.s. (at 1 KHz)}} \times 100$$

$$\Delta C_3 = \frac{[C] \text{ at } +20° \text{ C} - [C] \text{ at } +85° \text{ C or at } -30° \text{ C}}{[C] \text{ at } +20° \text{ C}} \times 100$$

As is clear from Table I, the specimens which are within the limits of the present invention have a high dielectric constant ($\epsilon_s$) from about 300 to about 1300, a low dielectric loss factor (tan$\delta$) and a small variation of the electrostatic capacity changing ratio $\Delta C_3$ (by %) with respect to the applied temperature. With respect to the electrostatic capacity changing ratios $\Delta C_3$, as will be understood from Table I, the variations are between plus and minus 15 percent ($\pm 15\%$).

Ceramic dielectrics which are utilized in certain high AC or DC voltage apparatuses or circuits must have, as mentioned before, a low dielectric loss factor (tan $\delta$), small electrostatic capacity changing ratio ($\Delta C_1$ and $\Delta C_2$) and small variation of the dielectric constant ($\epsilon_s$) both of the last two mentioned with respect to variation of the applied high AC or DC voltage. Thus, the ceramic dielectrics according to the present invention can easily comply with the above-mentioned requirement. This is because the composition of the ceramic dielectric according to the present invention is not comprised of a ferroelectric substance such as barium titanate (BaTiO₃), but is comprised of SrTiO₃. Consequently, a paraelectric state of SrTiO₃ causes the ceramic dielectric to have small variations of dielectric loss factor (tan $\delta$), the electrostatic capacity changing ratio ($\Delta C_1$ and $\Delta C_2$) and the dielectric constant ($\epsilon$) both of the last two mentioned with respect to variation of the applied high AC or DC voltage. However, SrTiO₃ has, as is well known, a defect in that it has a large electrostatic capacity changing ratio, for example $-3000$ PPM, with respect to variation of applied temperature. The above-mentioned defect of SrTiO₃ was removed according to the present invention, by adding MgO.

With regard to breakdown voltage, the breakdown voltage of the ceramic dielectric of the present invention is higher than that of the prior art by more than two times. For example, while the breakdown voltage of the specimen No. 33 is 4.5 KV/mm, the breakdown voltage of the specimen No. 15 is 12 KV/mm, wherein the breakdown voltages are expressed in the form of voltage gradients. It is believed that the higher breakdown voltage of the ceramic dielectric of the present invention is derived from the following fact. That is, the grains which form the ceramic dielectric are crystallized into fine grains, the diameters of which are between 1 and 2 $\mu$ when MgO or an oxide of a rare earth element is added. The addition of an oxide of a rare earth element is further effective in improving the characteristic of tanδ of the ceramic dielectric and, as is clear from Table I, the effectiveness becomes especially striking when the frequency of an applied AC voltage is relatively high.

The usefulness of the ceramic dielectric according to the present invention compared to the prior art or ceramic dielectrics which are beyond the limits of the present invention, will be more apparent from the following description with reference to the accompanying drawings.

FIG. 1 shows the variations of electrostatic capacity changing ratio $\Delta C_4$ by %, wherein [C] indicates a value of electrostatic capacity and $\Delta C_4$ is defined as follows.

$$\Delta C_4 = \frac{[C] \text{ at } +20° C - [C] \text{ at } -50° C \text{ through } +150° C}{[C] \text{ at } +20° C} \times 100$$

As can be seen from FIG. 1, specimen No. 15, which is within the limits of the present invention, has an extremely small variation of electrostatic capacity changing ratio with respect to variation of applied temperature. On the other hand, specimens No. 11 and No. 8, which are beyond the limits of the present invention have large variations of the above-mentioned ratio.

Figure 2:
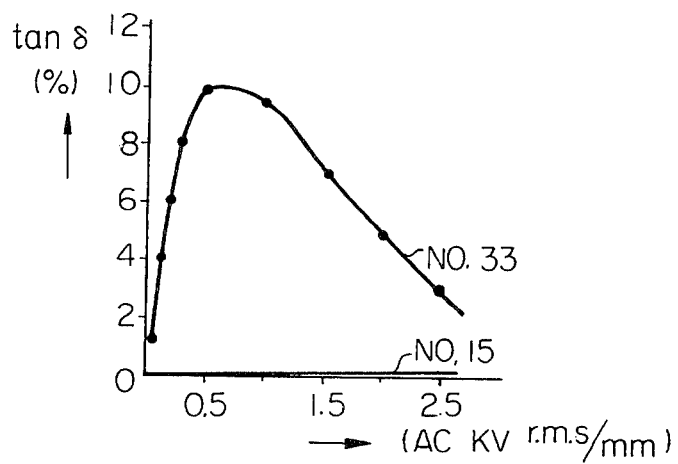
FIG. 2 shows the variations of the dielectric loss factor tan $\delta$ (by %) of the ceramic dielectrics both in the prior art and the present invention with respect to variation of the applied AC voltage gradient (by KV r.m.s./mm)

FIG. 2 shows variations of the dielectric loss factor tan δ by % of the ceramic dielectric of both specimen No. 15, which is within the limits of the present invention, and specimen No. 33, which is one of the prior arts. In FIG. 2 the dielectric loss factor tan δ was measured at some selected points of the applied AC voltage gradient up to 2.5 KV r.m.s./mm (at 50 Hz). As can be seen from FIG. 2, specimen No. 15 has an extremely low value, which is near 0%, and an extremely small variation of the dielectric loss factor tan δ. On the other hand specimen No. 33 has a wide variation of tan δ such as between near 0 and 10%.

Figure 3:
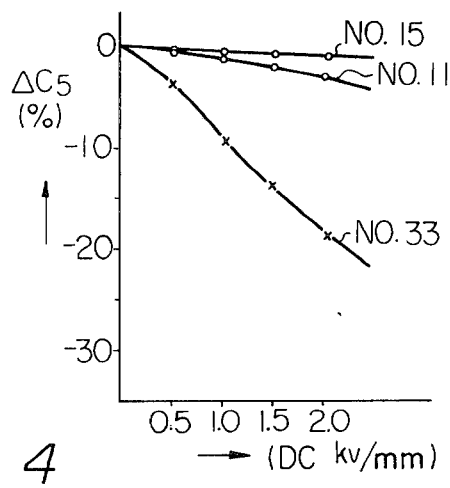
FIG. 3 shows the variations of the electrostatic capacity changing ratio $\Delta C_5$ (by %) with respect to variation of the applied DC voltage gradient by KV/mm with regard to ceramic dielectrics which are within the limits of the present invention, ceramic dielectrics which are beyond said limits and the ceramic dielectric of the prior art.

FIG. 3 shows the variations of the electrostatic capacity changing ratio $\Delta C_5$ by % of specimen No. 15 which is within the limits of the present invention, specimen No. 11, which is beyond the limits of the present invention, and specimen No. 33, which is one of the prior arts, wherein [C] indicates the value of electrostatic capacity at 20° C and $\Delta C_5$ is defined as follows.

$$\Delta C_5 = \frac{[C] \text{ at AC 5 V r.m.s. (at 1 KHz)} - [C] \text{ at 0 KV/mm through DC 2.0 KV/mm}}{[C] \text{ at AC 5 V r.m.s. (at 1 KHz)}} \times 100$$

As can be seen from FIG. 3, specimen No. 15 has an extremely small variation of the electrostatic capacity changing ratio with respect to the variation of the applied DC voltage gradient. For example, at DC 2.5 KV/mm in FIG. 3, the electrostatic capacity changing ratio of specimen No. 15 is still extremely small, such as near 0%, when compared with the changing ratios of specimens No. 11 and 33.

Figure 4:
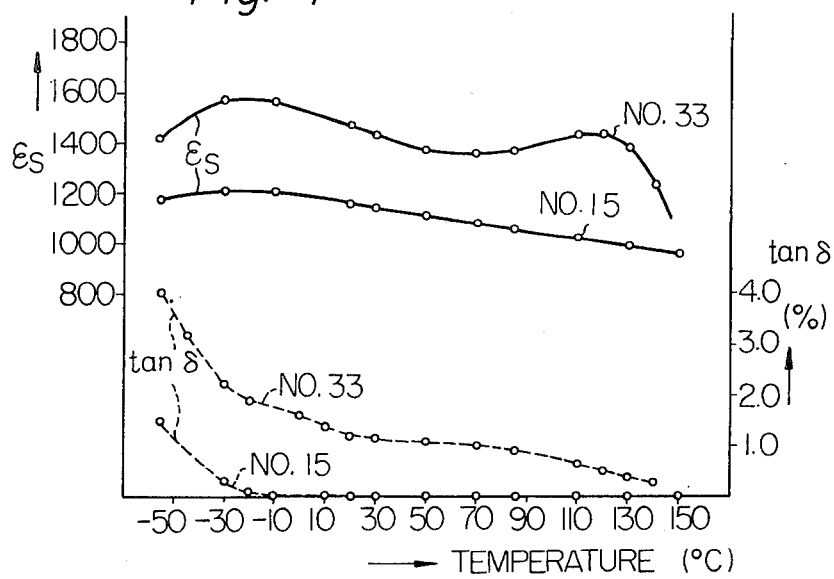
FIG. 4 shows the variations of the dielectric constant ($\epsilon_s$) and the dielectric loss factor (tan $\delta$ by %), with respect to a wide variation of applied temperatures with regard to the ceramic dielectric of the present invention and the ceramic dielectric of the prior art.

FIG. 4 shows variations of the dielectric constant $\epsilon_s$ and the dielectric loss factor tan δ by %, respectively, of specimen No. 15, which is within the limits of the present invention, and specimen No. 33 which is one of the prior arts. As can be seen from FIG. 4, specimen No. 15 has extremely small variations of the dielectric constant and the dielectric loss factor compared to the prior art with respect to wide variation of applied temperature.

The limits of the present invention can be defined by the facts, mentioned below, which are based on experiments with the present invention and, more definitely, by the data which are shown in Table I.

When under 30% by mol or over 90% by mol of $SrTiO_3$ is included in the ceramic dielectric, the dielectric constant $\epsilon_s$ becomes less than 290 and, thereby, a ceramic dielectric not suitable for practical use is produced. Further, when over 22% by mol of $Bi_2O_3$ is included in the ceramic dielectric, the ceramic dielectric becomes a highly porous body and, on the other hand, when under 1% by mol of the same is included in the ceramic dielectric, various electric characteristics such as the electrostatic capacity changing ratio with respect to an applied temperature deteriorate and, thereby a ceramic dielectric not suitable for practical use is produced. When over 69% by mol of $TiO_2$ is included in the ceramic dielectric, the dielectric constant $\epsilon_s$ becomes extremely low and, on the other hand, when under 5% by mol of the same is included in the ceramic dielectric, a dense and uniform ceramic dielectric cannot be produced and, thereby a ceramic dielectric not suitable for practical use is produced. When over 20% by weight of MgO is included in the ceramic dielectric, the dielectric constant $\epsilon_s$ becomes low and, in addition, it becomes difficult to sinter the ceramic dielectric conveniently because a temperature over 1400° C is required for sintering. On the other hand, when under 0.1% by weight of MgO is included in the ceramic body, a reduction is seen in the effects which result in the value of $\epsilon_s$ being high and improvement of the electrostatic capacity changing ratio with respect to variation of applied temperature. When over 10% by weight of an oxide of a rare earth element is included in the ceramic dielectric, the dielectric constant $\epsilon_s$ of the ceramic dielectric becomes low. On the other hand, when under 0.01% by weight of an oxide of a rare earth element is included in the ceramic dielectric, no advantages otherwise produced by adding an oxide of a rare earth element are obtained. Moreover, a ceramic dielectric which is dense and uniform is obtained by adding a predetermined amount of at least one the following materials to the basic composition of the ceramic dielectric as mineralizer, clay or oxide of Mn, Cr, Fe or Co. It is well known that the mineralizer acts to prevent the ceramic dielectric from being reduced by the air during sintering and also acts to make the ceramic dielectric dense and uniform. However, the various electric characteristics of the ceramic dielectric, such as are shown in columns 3 through 7, of Table I, should not be sacrificed when making the ceramic dielectric dense and uniform. Consequently, the quantity of the mineralizer should be carefully selected to be within the limits where the various electrical characteristics do not deteriorate.

The mineralizer Mn may be added, for example, in the form of $MnCO_3$. Similarly the mineralizer Cr may be added, for example, in the form of $Cr_2O_3$. Naturally these mineralizers can be added in the forms of other compounds which also produce the same effect of making the ceramic dielectric dense and uniform, but it should be recognized that the quantities of said compounds to be added are different from those of $MnCO_3$ or $Cr_2O_3$. In this case, the quantity of the mineralizer should be under 0.5 weight % with respect to the total weight of the basic composition of the ceramic dielectric according to the present invention. If over 0.5% by weight of the mineralizer is included in the ceramic dielectric, various electrical characteristics of the ceramic dielectric are extremely deteriorated. The limits of the quantity of the mineralizer should be between 0.1 through 0.5% by weight, wherein a dense and uniform ceramic dielectric can be obtained without deteriorating the various electrical characteristics of the ceramic dielectric.

As explained above, the basic composition of the ceramic dielectric according to the present invention comprises 30 to 94% by mol of $SrTiO_3$, 1 to 22% by mol of $Bi_2O_3$, 5 to 69% by mol of $TiO_2$, and further comprises 0.1 to 20% by weight of MgO with respect to the total weight of abovementioned three compounds $SrTiO_3$, $Bi_2O_3$ and $TiO_2$. Moreover 10% by weight of at least one of the oxides of the rare earth elements with respect to the total weight of abovementioned basic composition may be included in the ceramic dielectric. From such a composition, a ceramic dielectric of superior electric characteristics can be obtained which has such features as a high dielectric constant, low dielectric loss and small variations of the electrostatic capacity changing ratio and the dielectric loss of the last two mentioned with respect to wide variation of applied voltage. Further, a mineralizer may be included in the ceramic dielectric, whereby a dense and uniform ceramic dielectric can be produced.

In the above-mentioned embodiment, some raw materials are utilized in the form of carbonate such as $SrCO_3$ or $MgCO_3$, however, it should be noted that other forms, for example oxides, of the raw materials can be utilized without reducing the above-mentioned features.

Table I

| | 1 | | | | 2 | 3 |
|---|---|---|---|---|---|---|
| | % by mol | | | % by weight | % by weight Oxide of rare earth element | $\epsilon_s$ at AC 5 V r.m.s. (at 1 KHz) |
| Specimen No. | $SrTiO_3$ | $Bi_2O_3$ | $TiO_2$ | MgO | | |
| ① | 77.3 | 1.8 | 20.9 | 0 | 0 | 517 |
| 2 | 77.3 | 1.8 | 20.9 | 4.8 | 0 | 457 |
| ③ | 74.7 | 8.6 | 16.7 | 0 | 0 | 966 |
| 4 | 74.7 | 8.6 | 16.7 | 3.0 | 0 | 1070 |
| 5 | 74.7 | 8.6 | 16.7 | 5.3 | 0 | 882 |
| 6 | 74.7 | 8.6 | 16.7 | 12.0 | 0 | 742 |
| ⑦ | 74.7 | 8.6 | 16.7 | 20.5 | 0 | 475 |
| ⑧ | 72.3 | 7.1 | 20.6 | 0 | 0 | 1050 |
| 9 | 72.3 | 7.1 | 20.6 | 4.8 | 0 | 961 |
| 10 | 72.3 | 7.1 | 20.6 | 4.8 | $CeO_2$ 0.15 | 958 |
| ⑪ | 63.9 | 12.0 | 24.1 | 0 | 0 | 1080 |
| 12 | 63.9 | 12.0 | 24.1 | 1.0 | 0 | 1310 |
| 13 | 63.9 | 12.0 | 24.1 | 2.4 | 0 | 1215 |
| 14 | 63.9 | 12.0 | 24.1 | 2.4 | $La_2O_3$ 0.1 | 1180 |
| 15 | 63.9 | 12.0 | 24.1 | 2.4 | 0.5 | 1150 |
| 16 | 63.9 | 12.0 | 24.1 | 2.4 | 1.0 | 1020 |
| 17 | 63.9 | 12.0 | 24.1 | 2.4 | 3.0 | 970 |
| 18 | 63.9 | 12.0 | 24.1 | 2.4 | 5.0 | 750 |
| 19 | 63.9 | 12.0 | 24.1 | 2.4 | 10.0 | 480 |
| 20 | 63.9 | 12.0 | 24.1 | 2.4 | 0.5 | 1082 |
| 21 | 63.9 | 12.0 | 24.1 | 2.4 | 1.0 | 1010 |
| 22 | 63.9 | 12.0 | 24.1 | 2.4 | 5.0 | 722 |
| 23 | 52.1 | 9.5 | 38.4 | 4.8 | 0 | 957 |
| ㉔ | 36.0 | 21.5 | 42.5 | 0 | 0 | 320 |
| 25 | 36.0 | 21.5 | 42.5 | 2.0 | 0 | 410 |
| 26 | 36.0 | 21.5 | 42.5 | 10.0 | 0 | 290 |
| ㉗ | 36.0 | 21.5 | 42.5 | 32.0 | 0 | 193 |
| 28 | 36.0 | 21.5 | 42.5 | 2.0 | $La_2O_3$ 1.0 | 405 |
| 29 | 33.1 | 9.8 | 57.1 | 2.5 | 0 | 387 |
| ㉚ | 31.2 | 22.9 | 45.9 | 20.5 | 0 | 215 |
| 31 | 29.5 | 2.6 | 67.9 | 3.0 | 0 | 511 |
| ㉜ | 10.8 | 2.1 | 87.1 | 2.5 | 0 | 262 |
| *33 | $BaTiO_3$ 98.0 | | $Bi_2(SnO_3)_3$ 2.0 | | | 1470 |
| ㉞ | 63.9 | 12.0 | 24.1 | 2.4 | $CeO_2$ 15.0 | 278 |

| | 4 | | 5 | | 6 | 7 | |
|---|---|---|---|---|---|---|---|
| | tan δ(%) at AC 5 V r.m.s. | | at AC 0.5 KV r.m.s./mm (at 50 Hz) | | at DC 2 Kv/mm | $\Delta C_3$ (%) | |
| Specimen No. | at 1 KHz | at 1 MHz | $\Delta C_1$ (%) | tan δ (%) | $\Delta C_2$ (%) | −30° C | +85° C |
| ① | 0.02 | 0.04 | +0.5 | 0.4 | 0 | +21.5 | −21.0 |
| 2 | 0.02 | 0.07 | +0.6 | 0.04 | 0 | +13.5 | −15.5 |
| ③ | 0.3 | 0.18 | +1.8 | 0.55 | −2.7 | +18.7 | −16.7 |
| 4 | 0.05 | 0.33 | +1.0 | 0.15 | −1.3 | +7.0 | −11.8 |
| 5 | 0.03 | 0.5 | +0.7 | 0.05 | −0.8 | +4.8 | −10.5 |
| 6 | 0.03 | 0.47 | +0.6 | 0.08 | −0.5 | +5.2 | −8.8 |
| ⑦ | 0.03 | 0.4 | +0.2 | 0.08 | 0 | +4.7 | −8.5 |
| ⑧ | 0.3 | 0.4 | +1.7 | 0.42 | −2.6 | +18.0 | −19.0 |
| 9 | 0.05 | 0.7 | +1.0 | 0.15 | −0.8 | +4.8 | −9.3 |
| 10 | 0.03 | 0.4 | +1.0 | 0.08 | −0.5 | +5.1 | −8.7 |
| ⑪ | 0.8 | 1.8 | +2.5 | 1.8 | −3.4 | +14.3 | −15.1 |

Table I-continued

| | | | | | | | |
|---|---|---|---|---|---|---|---|
| 12 | 0.1 | 2.0 | +1.1 | 0.15 | −1.6 | +9.8 | −12.3 |
| 13 | 0.05 | 3.4 | +1.0 | 0.1 | −1.5 | +4.8 | −8.5 |
| 14 | 0.03 | 3.2 | +0.8 | 0.05 | −1.4 | +5.0 | −8.0 |
| 15 | 0.02 | 2.5 | +0.5 | 0.04 | −0.8 | +4.5 | −8.5 |
| 16 | 0.02 | 2.1 | +0.5 | 0.04 | −0.5 | +4.8 | −7.9 |
| 17 | 0.01 | 1.1 | +0.1 | 0.01 | −0.5 | +7.0 | −8.0 |
| 18 | 0.01 | 0.6 | 0 | 0.01 | −0.3 | +7.1 | −8.3 |
| 19 | 0.01 | 0.06 | 0 | 0.01 | 0 | +6.8 | −7.8 |
| 20 | 0.02 | 2.6 | +0.8 | 0.04 | −1.7 | +4.0 | −8.0 |
| 21 | 0.01 | 1.9 | +0.5 | 0.03 | −1.3 | +5.7 | −8.5 |
| 22 | 0.01 | 0.7 | +0.2 | 0.01 | −0.5 | +6.9 | −8.1 |
| 23 | 0.05 | 1.4 | +0.7 | 0.1 | −0.8 | +3.8 | −9.7 |
| ㉔ | 1.1 | 1.4 | +2.2 | 2.8 | −1.2 | −1.8 | +1.3 |
| 25 | 0.3 | 0.55 | +0.2 | 0.5 | −0.2 | −3.8 | +5.8 |
| 26 | 0.2 | 0.8 | +0.1 | 0.3 | 0 | −12.8 | +14.5 |
| ㉗ | 0.4 | 2.0 | 0 | 0.7 | 0 | −42.0 | +66.0 |
| 28 | 0.1 | 0.3 | +0.1 | 0.15 | −0.2 | −10.8 | +12.0 |
| 29 | 0.07 | 0.25 | +0.5 | 0.15 | −0.1 | +1.8 | −4.8 |
| ㉚ | 0.3 | 1.3 | +0.5 | 0.4 | 0 | −48.0 | +70.4 |
| 31 | 0.02 | 0.3 | +0.3 | 0.1 | −0.2 | +19.0 | −18.0 |
| ㉜ | 0.02 | 0.11 | 0 | 0.1 | 0 | +14.5 | −11.6 |
| *33 | 1.2 | 4.5 | +42.0 | 10.0 | −18.5 | +8.0 | −7.2 |
| ㉞ | 0.01 | 0.04 | 0 | 0.01 | 0 | +5.0 | −7.3 |

What is claimed is:

1. A ceramic dielectric composition comprised of 30 to 94% by mol of $SrTiO_3$, 1 to 22% by mol of $Bi_2O_3$ and 5 to 69% by mol of $TiO_2$, and 0.1 to 20% by weight of MgO based on the total weight of the above-mentioned three compounds $SrTiO_3$, $Bi_2O_3$ and $TiO_2$, the amount of MgO being selected to provide a ceramic dielectric composition exhibiting reduced dielectric loss factor and reduced variation of the electrostatic capacity with respect to applied temperatures or voltages, as compared to a ceramic dielectric composition containing no MgO; and further including an amount ranging from 0.01 to 10% by weight of at least one of the oxides of the rare earth elements, said amount being selected to provide a ceramic dielectric compositon with reduced dielectric loss factor as compared to a ceramic dielectric composition which is otherwise the same but contains no oxide of the rare earth elements.

2. A ceramic dielectric composition as set forth in claim 1 which further includes at least one of the following materials: clay or oxides of Mn, Cr, Fe, or Co.

3. A ceramic dielectric composition consisting essentially of 30 to 94% by mol of $SrTiO_3$, 1 to 22% by mol of $Bi_2O_3$, 5 to 69% by mol of $TiO_2$, and 0.1 to 2.4% by weight of MgO based on the total weight of the above-mentioned three compounds $SrTiO_3$, $Bi_2O_3$, and $TiO_2$, the amount of MgO being selected to provide a ceramic dielectric composition exhibiting reduced dielectric loss factor and reduced variation of the electrostatic capacity with respect to applied temperatures or voltages, as compared to a ceramic dielectric composition which is the same except for the presence of a greater or lesser amount of MgO.

4. A ceramic dielectric composition according to claim 3 containing less than 10% by weight, based on the total weight of the $SrTiO_3$, the $Bi_2O_3$, the $TiO_2$, and the MgO, of at least one member selected from the group consisting of the oxides of rare earth elements, the amount of said member being selected to provide a ceramic dielectric composition with reduced dielectric loss factor as compared to the same composition containing no oxide of a rare earth element.

5. A ceramic dielectric composition according to claim 4 wherein the amount of an oxide of a rare earth element is at least 0.01% by weight.

6. A ceramic dielectric composition according to claim 4, wherein said composition further contains 0.1 to 0.5% by weight, based on the total weight of the $SrTiO_3$, the $Bi_2O_3$, the $TiO_2$, and the MgO, of at least one member selected from the group consisting of clay and the oxides of Mn, Cr, Fe, and Co.

* * * * *

UNITED STATES PATENT AND TRADEMARK OFFICE
CERTIFICATE OF CORRECTION

PATENT NO. : 4,017,320
DATED : April 12, 1977
INVENTOR(S) : Shinobu Fujiwara and Hitoshi Tanaka It is certified that error appears in the above-identified patent and that said Letters Patent are hereby corrected as shown below:

In column 8, in Table 1, Specimen 31, under 3, "511" should read --512--.
In column 8, in Table 1, Specimen 1, under 5, "0.4" should read --0.04--.

Signed and Sealed this twenty-third Day of August 1977

[SEAL]

Attest:

RUTH C. MASON
*Attesting Officer*

C. MARSHALL DANN
*Commissioner of Patents and Trademarks*